APPARATUS FOR COUNTING AND PACKAGING ARTICLES

Original Filed Jan. 6, 1956 5 Sheets-Sheet 1

INVENTORS
ERIC G. CLEVELAND
ARCHIBALD D. STANDLEY, JR.
BY
Porter, Chittick & Russell
Attorneys APPARATUS FOR COUNTING AND PACKAGING ARTICLES
Original Filed Jan. 6, 1956 5 Sheets-Sheet 2
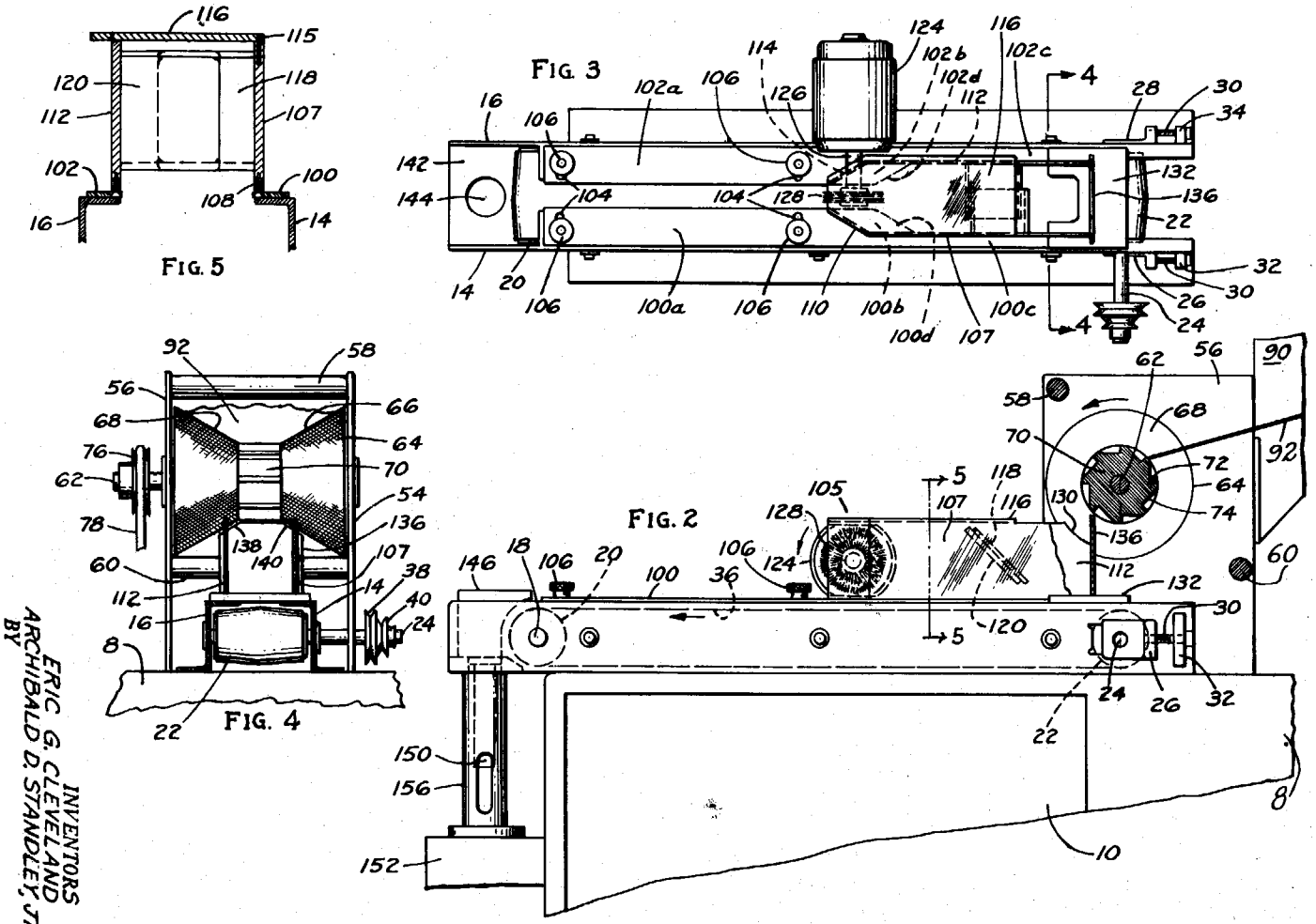
INVENTORS
ERIC G. CLEVELAND
ARCHIBALD D. STANDLEY, JR.
BY
Porter, Chittick & Russell
Attorneys

APPARATUS FOR COUNTING AND PACKAGING ARTICLES

Original Filed Jan. 6, 1956 5 Sheets-Sheet 3

INVENTORS
ERIC G. CLEVELAND
ARCHIBALD D. STANDLEY, JR.
BY
Porter, Chittick & Russell
Attorneys

APPARATUS FOR COUNTING AND PACKAGING ARTICLES

Original Filed Jan. 6, 1956 5 Sheets-Sheet 4

INVENTORS
ERIC G. CLEVELAND
ARCHIBALD D. STANDLEY, JR.
BY
Porter, Chittick & Russell
Attorneys INVENTORS
ERIC G. CLEVELAND
ARCHIBALD D. STANDLEY, JR.
BY
Porter, Chittick & Russell
Attorneys United States Patent Office Re. 25,013
Reissued July 25, 1961

25,013

APPARATUS FOR COUNTING AND PACKAGING ARTICLES

Eric G. Cleveland, Melrose, and Archibald D. Standley, Jr., Danvers, Mass., assignors to Delta Engineering Corporation, Boston, Mass., a corporation of Massachusetts Original No. 2,899,784, dated Aug. 18, 1959, Ser. No. 557,819, Jan. 6, 1956. Application for reissue Jan. 25, 1961, Ser. No. 90,596
11 Claims. (Cl. 53—61)

Matter enclosed in heavy brackets [ ] appears in the original patent but forms no part of this reissue specification; matter printed in italics indicates the additions made by reissue.

This invention relates to the art of counting and packaging articles. Heretofore various types of machines have been devised for counting articles, but such machines have generally suffered from excessive cost, mechanical failure, lack of speed, inability to count articles of various sizes, failure to render a dependable count under all conditions of operation, or lack of adaptability for use with other apparatus such as packaging or bottling machines.

Accordingly it is an object of this invention to provide a counting machine adapted to overcome the aforesaid difficulties attendant to previous machines.

Another object of this invention is to provide a combination counting and packaging system which automatically and reliably operates to count and package small articles at a rapid rate without the articles being contacted by human hands.

Another object of the present invention is to provide a method of automatically counting and packaging small articles at a rapid rate without error.

Other objects and many of the attendant advantages of this invention will be readily appreciated as the same becomes better understood by reference to the following detailed description when considered in connection with the accompanying drawings, wherein:

FIG. 2 is an enlarged view, partly in section, of a portion of the counting machine embodied in the apparatus of FIG. 1;

FIG. 3 is a plan view of the structure shown in FIG. 2;

FIG. 4 is a vertical section taken along line 4—4 of FIG. 3;

FIG. 5 is a vertical section taken along line 5—5 of FIG. 2;

Figure 1:
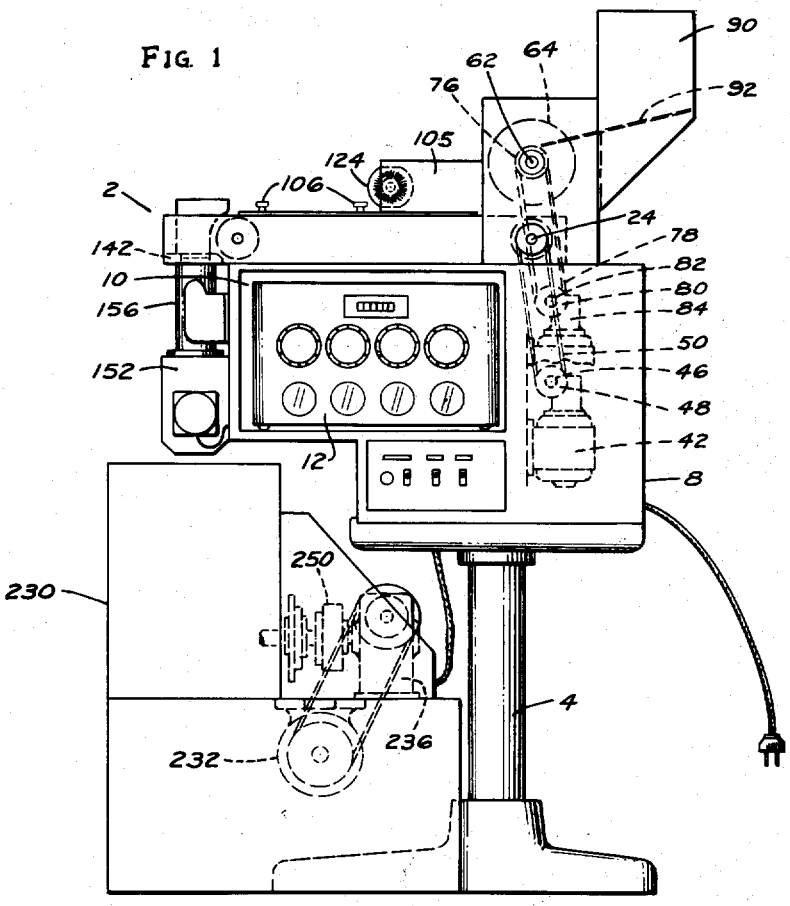
FIG. 1 is a side view in elevation of a novel electromechanical system for counting and packaging small articles according to the present invention.

Referring now to FIG. 1, there is shown a counting machine, generally indicated at 2, mounted on a suitable supporting pedestal base 4 in proximity to a wrapping or packaging machine 230. The packaging machine is conventional, and, therefore, is shown schematically except for its driving mechanism which is shown in more detail to indicate the extent to which it has been modified for the purposes of this invention as described hereafter.

Any packaging machine of the type utilizing the method similar to the one outlined in United States patent to L. L. Salfisberg No. 2,141,318 can be used. In practice we have found a machine of the type shown and described in detail in United States patent to H. P. Lewis No. 2,626,494 to be particularly adaptable for the purposes of the present invention.

For comprehension of the present invention the packaging apparatus may be briefly described as comprising two molding rolls each provided with a series of depressions on its surface, means for rotating the rolls in opposite directions in synchronism, and means for feeding two webs of thermoplastic material to the nip region of the molding rolls where the latter pick up the webs and bring them together, under pressure, the web being sealed transversely, then longitudinally, and then transversely in continuous succession, and means for directing articles to be packaged between the webs so as to cause the articles to be carried in the depressions in the molding rolls as the latter rotate and seal the webs together.

In conventional machines of this type the sealing rolls rotate at an intermittently predetermined speed. However, in order to provide a counting and packaging system that is completely accurate, it has been determined that the certain speed must be variably controlled and, for this reason, the driving mechanism of the packaging machine is modified, as explained hereinafter.

Counting machine 2 comprises an enclosure 8 mounted on base 4. Enclosure 8 has a rectangular cavity 10 within which is positioned a conventional counter 12 of the type that can be preset to count to a predetermined sub-total, to actuate associated mechanism upon attainment of the sub-total, and to add the sub-totals together to maintain a running summary. A decitron counter, manufactured by the Post Machinery Company of Beverly, Massachusetts, has been used successfully in the illustrated installation.

Mounted on top of enclosure 8 are two Z-section side members 14 and 16. Journaled in the two side members adjacent their front ends is a shaft 18 on which is mounted a guide roll or pulley 20 which tapers slightly toward its ends. A second pulley 22 is carried by a drive shaft 24 journaled in the two movable bearing blocks 26 and 28. The bearing blocks, each carried in grooves in Z-members 14 and 16, are movable toward and away from pulley 20 by means of screws 30 carried by collars 32 and 34 fixedly secured to the two Z-members 14 and 16. Running about the two pulleys is an endless belt 36. By moving pulley 22 it is possible to adjust the tension of belt 36. Attached to the outer end of drive shaft 24 is a pair of pulleys 38 and 40 of different size. Mounted within casing 8 is a gear head electric motor 42 whose output shaft 46 rotates at a lesser speed than the motor's armature. Carried on one end of shaft 46 is a pulley 48 which acts through belt 50 to turn drive shaft 24, pulley 22, and belt 36. It has been found that the machine operates successfully when the belt is driven at a rate of 120 feet per second.

Also secured to the top of enclosure 8 are two side plates 54 and 56 supported in parallel-spaced relation by a pair of braces 58 and 60. Journaled in the two side plates is a shaft 62 on which is fixedly carried a feed roll generally designated by numeral 64. The shape of feed roll 64 conforms substantially to that of an hour glass, having tapered frusto-conical end sections tapering inwardly from its ends 66 and 68 and an intermediate constant diameter section 70 provided with a plurality of saw teeth whose radially extending faces 72 lead inclined step sections 74 in the direction of rotation of the feed roll. Carried on the outer end of shaft 62 is a pulley 76 which is driven by a belt 78 from a pulley 80 attached to output shaft 82 of a second gear-head motor 84 mounted within enclosure 8.

Secured to side plates 54 and 56 at the rear edges is a hopper enclosure 90 having a sloping delivery member 92 whose forward edge terminates close to feed roll 64. The forward end of delivery member 92 is shaped similarly to the upper end of vertical member 136 (described hereinafter) to nest close to the sections 66, 68 and 70 of the feed roll.

Resting on top of Z members 14 and 16 are two guide members 100 and 102 each provided with elongated slots 104. Thumb screws 106 extend through slots 104 and are screwed into threaded openings in the top flanges 14a and 16a of the two Z members. The two guide members 100 and 102, run rearwardly from about the axis of pulley 20 to a point short of pulley 22, and comprise three distinct sections indicated by numerals 100a, b, c, and 102a, b and c. Sections 100a and 102a are of greatest width and are flat throughout. Sections 100c and 102c are of narrowest width and are also flat. Section 100b is intermediate sections 100a and 100c. Section 102b bears a similar relation to sections 102a and 102c. Section 100b is set at a compound angle to sections 100a and 100c, sloping downwardly (a) toward the center line of belt 36, and (b) toward pulley 22, terminating in knife edge 100d positioned close to but preferably not touching belt 36. Section 102b slopes similarly toward the center of belt 36 and toward pulley 22. Both guides 100 and 102 have depending flanges 100f and 102f respectively that terminate just short of engagement with belt 36. Both flanges 100f and 102f extend rearwardly up to sloping sections 100b and 102b.

Secured to the top of the guide members is an enclosure generally designated as 105 (see FIGS. 1–5) adapted to vary in width as the guide members are moved toward and away from each other. Enclosure 105 comprises a first vertical side wall 107 attached to guide member 100 by means of screws 108 (FIG. 5). Side wall 107 includes at its front end an inwardly extending section 110 which terminates at the edge of guide section 100a. A second side wall 112 similar to side wall 107 is secured to guide member 102. Side wall 112 also has an inwardly extending section 114 similar to side wall 107. Attached to the top edge of side wall 107 by means of pins 115 is a horizontal top wall 116 which lies in close sliding engagement with the top edge of side wall 112. Secured to side walls 107 and 112 are two baffle members 18 and 120 which overlap each other and are inclined downwardly and rearwardly. Mounted on top of enclosure 8 is a third motor 124 having a drive shaft 126 that extends through the forward section 114 of side wall 112. On the end of shaft 126 is a brush element 128 whose bristles are of such length as to extend substantially to the level of the top surface of guide members 100 and 102. Motor 124 rotates brush 128 in a counterclockwise direction as viewed in FIG. 2. The rear edges of side walls 107 and 112 extend proximate to the feed roll and are cut away as at 130 (FIG. 2) to lie closely against the tapered parts of the feed roll. Secured to the two Z members 14 and 16 below the feed roll is a flat plate 132 which carries a vertical member 136 whose top corners are cut away as at 138 and 140 so as to fit close to the feed roll (see FIG. 4). Vertical member 136 abuts the rear ends of side wall members 107 and 112 and forms part of the enclosure 105.

Mounted between Z members 14 and 16 at the front ends is a rectangular block 142 having a central opening 144. Removably supported by block 142 is a curved guard member 146 undercut at its bottom to provide a circular extension 148 that fits within opening 144. Formed integral with extension 148 is a vertical tube 150 of predetermined diameter.

Attached to the front wall of enclosure 8 is a small substantially rectangular casing 152 having an aperture 154 in its top. Secured to the top wall is a large tubular element 156 whose interior diameter is substantially the same as that of aperture 154.

Tubular element 156 surrounds tube 150 and engages the bottom of block 142. A pair of slits 160 and 162 are provided in tube 156 in diametrical opposite relation to each other. Secured to the front wall of casing 8 is a photoelectric eye assembly comprising a light source 166 and a phototube receiver 168. Wires 170 and 172 (FIG. 6) extend through openings in the front wall of enclosure 8 and connect the photoelectric eye assembly to the electronic counter, as hereinafter explained.

Figure 6:
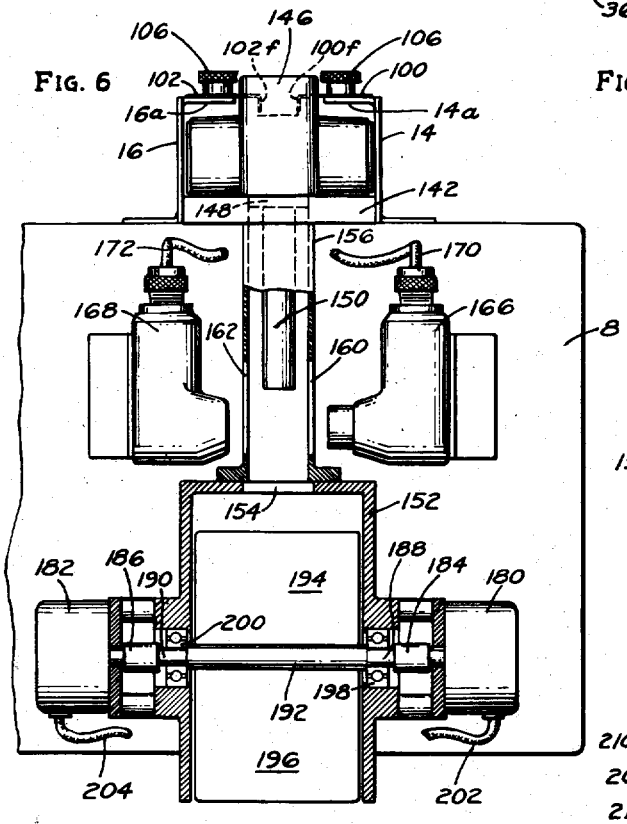
FIG. 6 is an enlarged front elevation, partly in section, of the front end of the counting machine.
Figure 7:
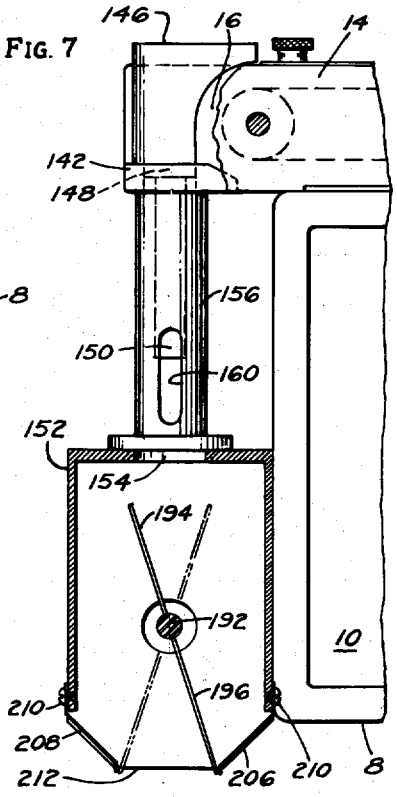
FIG. 7 is an enlarged side elevation of the front end of the counting machine.

A pair of rotary solenoids 180 and 182 are mounted at opposite sides of casing 152. As seen in FIG. 6, the solenoids have output shafts coupled by suitable connecting means 184 and 186 to the ends 188 and 190 of a common shaft 192 carrying two radially extending blades 194 and 196 mounted in diametrical relation. The combination of shaft 192 and blades 194 and 196 may be termed a shutter or gate. Shaft 192 and blades 194 and 196 together with casing 152 function as a flow divider, as hereinafter explained. The ends 188 and 190 of shaft 192 are supported by bearings 198 and 200 mounted in openings in casing 152. Cables 202 and 204 extend into casing 8 to provide electrical connections with the electric eye system and the electronic counter. The solenoids are identical in operation and, because they are oppositely mounted, act to turn shaft 192 in opposite directions. The open bottom end of casing 152 is partially blocked by two inclined barriers 206 and 208 (FIG. 7) which are removably secured to the casing by screws 210. The two barriers define a narrow outlet 212. Blade 196 extends into the outlet 212 and, depending upon which solenoid is energized, engages or extends close to the bottom edges of one of the barriers 206 and 208 as shown in FIG. 7. The solenoids rotate shaft 192 through limited arcs as, for example, 350.

Assuming hopper 90 to be filled with articles to be counted, and the various motors and electrical components to be connected to suitable power supplies, operation of the above described counter unit is as follows:

The articles placed in hopper 90 fall by gravity along chute 92 toward the hour glass shaped feed roll 64. The intermediate section 70 of feed roll 64, rotating in a counterclockwise direction as viewed in FIG. 2, picks up the articles from inclined chute 92 and carries them around until they fall by gravity into enclosure 105. Enclosure 105, as seen in FIGS. 2 and 3, is open at the top adjacent the feed roll so as to receive the articles falling therefrom. The falling articles drop upon moving belt 36 and are carried thereby in the direction of guard member 146. The articles fall upon belt 36 from the feed roll in a haphazard manner. Some of the articles may fall on deflecting members 118 and 120 which direct them downward onto the belt in front of base plate 132. As the articles move forward on belt 36 the side walls 107 and 112 of enclosure 105 prevent them from overflowing the sides of the machine, and also assist sloping sections 100b and 102b in diverting them toward the center of the belt. Sloping sections 100b and 102b tend to cause the articles as they approach the forward end of enclosure 105 to aline themselves in a single file. This tendency is promoted by rotating brush 128 which, as seen in FIG. 2, rotates in a counterclockwise direction, and also by the guide members 100 and 102 which are adjusted so that the spacing between the inner edges of sections 100a and 102a is just large enough to accommodate articles in single file, but not abreast of each other. The bristles of brush member 128 do not extend to any substantial degree below the upper surface of guide sections 100a and 102a, being of such length that the spacing between them and belt 36 is sufficient to allow passage of one article at a time. Thus, if one article is riding on another, the bristles of the brush will lightly engage the topmost article and toss it rearwardly in the direction of angularly positioned baffle members 118 and 120. Some of the articles that fall from sloping sections 100b and 102b fall against the sides of brush element 128 and are also thrown rearwardly. This prevents the articles from accumulating in the forward end of enclosure 105 and thereby tends to prevent more than one article at a time from passing into the channel formed by the two guide members. The forward sections 100a and 102a of the two guide members keep the articles alined in a single file as they are carried forward toward guard member 146 by belt 36. At the forward end the articles fall off of belt 36 into tube 150 carried by guard 146. Tube 150 is of such size as to prevent passage therethrough of more than one article at a time. As the articles pass out of the bottom end of tube 150 they interrupt the light beam emanating from light source 166. When this occurs phototube 168 sends a signal to counter 12, as explained hereinafter. The articles after interrupting the light beam pass through opening 154 into the casing 152. Assuming that barrier members 206 and 208 are secured to casing 152, the articles will collect at the bottom of the casing. The position of blades 194 and 196 of the flow divider determines on which side of the enclosure the articles will be directed. Thus if blade 96 lies close to or against barrier 206, as illustrated in FIG. 7, the articles will collect in the space between blade 96 and barrier 206. When the flow divider is turned to the dotted line position shown in FIG. 7, the articles will collect in the space between blade 96 and barrier 208. When solenoid 180 or 182, as the case may be, is energized, so as to reverse the position of blade 196, the articles that have collected in enclosure 152 will be discharged through opening 212 to the packaging machine, as explained hereinafter.

The reason for making barriers 206 and 208 detachable is so they can be removed from the counting unit when the latter is operated apart from the packaging machine. In the latter situation blades 194 and 196 serve merely to divert flow of articles from casing 152 from one direction to another as, for example, when one large container has been filled and it is desired to divert the articles into a second empty container. It is also to be understood that casing 152 and the various elements carried thereby may be entirely omitted when it is desired merely to provide a continuous count, as, for example, in determining inventory.

Figure 8:
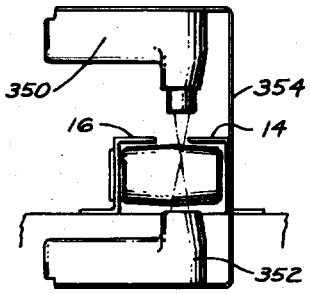
FIG. 8 is a fragmentary front view in elevation of a modified form of the counting machine.
Figure 9:
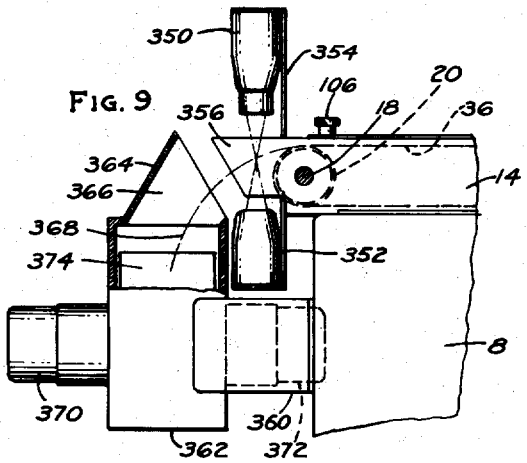
FIG. 9 is a side view in elevation, partly in section, of the modified form of counting machine shown in FIG. 8.

FIGS. 8 and 9 show a modified mounting for the electric eye sub-assembly of the counting unit. In this case a light source 350 and a phototube 352 are supported by a bracket 354 secured to an extension 356 of Z-member 14. Light source 350 and phototube 352 are so mounted that the light beam is directed vertically or substantially so through the path of articles falling from belt 36.

It is to be noted that the light beam must be properly positioned relative to the top of blade 194 in order to secure accurate and fast flow division. The proper distance between the light beam and the top of blade 194 is readily determined by trial and error.

Attached to casing 8 by means of a bracket 360 is a rectangular tube 362 provided at its open top end with an inclined front wall 364 and two triangular side walls. Only one side wall 366 is shown but it is to be understood that the missing wall is of the same shape and cooperates with front wall 364 and the other side wall 366 to provide a rectangular opening positioned to receive articles falling from conveyor 36. Dashed line 368 indicates the trajectory of articles falling from the conveyor. Tube 362 carries two rotary solenoids 370 and 372 corresponding to the solenoids 180 and 182. However, in this case the solenoids are mounted fore and aft rather than on the sides of the tube as are solenoids 180 and 182. Solenoids 370 and 372 operate a butterfly closure member 374 which controls the flow of articles through the tube. In this case the closure member engages opposite side walls of the tube alternately. However, if desired, the length of the blades may be shortened so as to merely divert and not to temporarily impede the flow of articles out of the bottom of tube 362.

Figure 10:
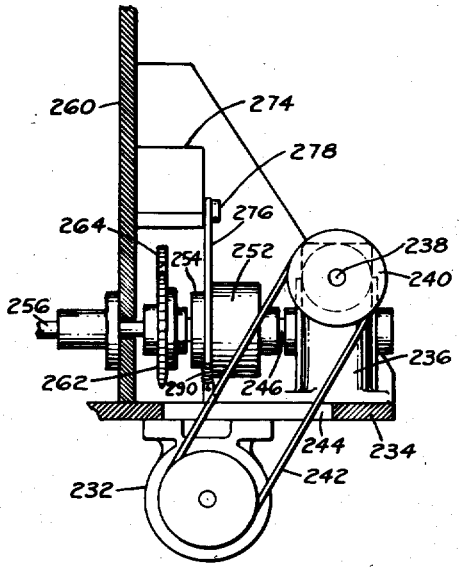
FIG. 10 is an enlarged side view, partly in section, of the [drawing] *driving* mechanism for the packaging machine shown in FIG. 1.
Figure 11:
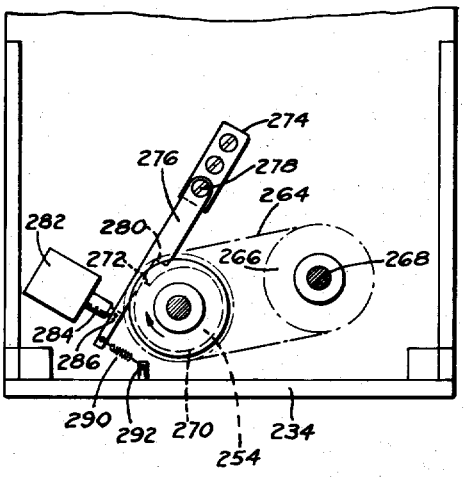
FIG. 11 is an enlarged [side] *rear* elevation, partly in section, of the clutch assembly embodied in the driving mechanism shown in FIG. [11] *10*; [and,]

FIGS. 1, 10 and 11 show a drive system for a packaging machine 230, the drive system being so constructed as to permit the packaging machine to be controlled by the above described counter unit.

A motor 232 is secured to the under side of a wall member 234 of the packaging machine. A gear reduction unit 236 is mounted on the upper side of the same wall member. The gear reduction unit has an input shaft 238 provided with a pulley 240 which is driven by motor 232 acting through belt 242 extending through an opening 244 in wall 234. The output shaft 246 of the gear reduction unit is connected to a single revolution clutch 250 having a first clutch member 252 affixed to shaft 246 and a second clutch member 254 in frictional engagement with the first member 252. Securely connected to second clutch member 254 is an output shaft 256 which is journaled in a vertical wall 260 of the packaging machine. Shaft 256 may be connected to a knife cutter for severing the web of packets produced by the packaging machine. Also carried by shaft 256 in fixed relation to clutch member 254 is a sprocket 262 carrying a drive chain 264 for driving the sealing rolls or dies of the packaging machine. FIG. 11 schematically shows chain 264 attached to a second sprocket 266 carried by a shaft 268. It is to be understood that shaft 268 is operatively coupled to drive two sealing rolls of the type embodied in the packaging devices illustrated in the aforementioned Salfisberg Patent No. 2,141,318 and Lewis Patent No. 2,626,494.

The exterior surface of clutch member 254 is machined to provide a cam surface 270 whose radius varies to provide an abutment 272. Mounted on the rear side of vertical wall 260 of the packaging machine is a bracket 274 which carries a lever 276 pivoted at 278. One edge of lever 276 is notched as at 280 to engage abutment 272 of the cam surface 270. A solenoid 282 (omitted in FIG. 10 for clarity but shown in FIG. 11) has its armature 284 pivotally connected at 286 to lever 276.

A tension spring 290 secured at 292 to wall member 234 normally keeps lever 276 in engagement with cam surface 270. So long as lever 276 is in locking engagement with abutment 272, second clutch member 254 and also sprocket 262 and shaft 256 remain at rest notwithstanding rotation of first clutch member 252. When solenoid 282 is energized (as explained hereinafter), armature 284 is withdrawn, causing lever 276 to rotate clockwise (FIG. 11) away from clutch member 254. This frees clutch member 254 and allows it to be driven by clutch member 252. Upon deenergization of the solenoid, spring 290 pulls lever 276 counterclockwise into engagement with cam surface 270. Shaft 256 and clutch member 254 continue to rotate until the abutment 272 is again engaged by the notched portion 280 of lever 276, whereupon driven clutch element 252 continues to rotate but driven clutch member 254 and shaft 256 come to rest.

Figure 12:
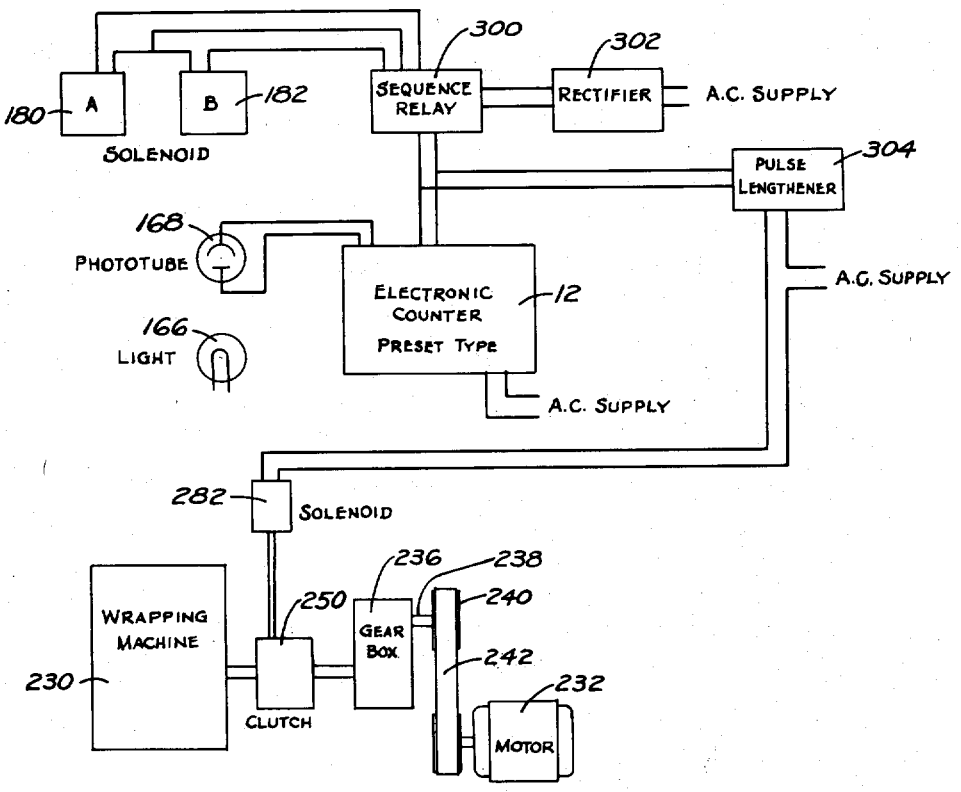
FIG. 12 is a schematic design of the electrical unit connecting the counting and packaging machines so as to cause the two machines to operate in synchronism[.]; *and*

FIG. 12 is a schematic circuit diagram including additional components not previously referred to. Although in this figure the connection between clutch 250 and wrapping machine 230 is shown only schematically, it is to be understood that actually the connection is as shown in FIG. 10. Moreover, although the various motors of the counting machine are not shown in the diagram, it is to be understood that they, and also the motors of the packaging machine, are all adapted to be coupled to an alternating current power supply. It is also to be understood that the circuit is the same when the electric eye system is mounted as in FIGS. 8 and 9.

In the circuit, electronic counter 12 is the primary or steering component. Any conventional electronic counter, other than the Post counter referred to previously, may be employed provided it is adapted to yield an output signal when a predetermined number of input signals have been applied to it. The counter should also be adapted to supply a visual indication of the total number of input signals applied to it, as well as being adjustable as to the number of input signals required to produce an output signal.

Counter 12 is connected to a suitable A.C. supply. Phototube 168 is connected to it, as indicated, so as to provide an input signal. Although not shown it is to be understood that light 166 is also connected to a suitable source of power. On its output side counter 12 is connected to a sequence relay 300. The latter is connected to rectifier 302 on one side and to solenoids 180 and 182 on the other side. Sequence relay 300 functions as a switch to alternately connect solenoids 180 and 182 to rectifier 302. Relay 300 is triggered by the output signals from counter 12. Upon application of a signal from counter 12, relay 300 changes its connection from one to the other of solenoids 180 and 182 and maintains its new connections until another signal is applied to it from counter 12, whereupon it again changes its connections. In this way solenoids 180 and 182 are alternately energized by the output of rectifier 302. Thus, for example, assuming solenoid 180 to be energized and solenoid 182 to be de-energized, when a pulse or signal is produced by counter 12 it is automatically applied to sequence relay 300, causing the latter to break its circuit with solenoid 180 and to close the circuit with solenoid 182. When this occurs solenoid 182 operates shaft 192 to turn blades 194 and 196 to a new position as shown in FIG. 7.

The output of counter 12 is also connected on its output side to a pulse lengthener 304 which operates to increase the time duration of the signal output from the counter. Pulse lengthener 304 is connected to clutch solenoid 282 so as to apply its output thereto. The purpose of pulse lengthener 304 will be explained hereinafter. However, it is to be noted that most electronic counters hitherto available are capable of producing output pulses only of fixed time duration. While some conventional counters may be adapted to selectively provide output pulses of various time durations, the output pulse periods are generally fixed so that it is difficult to vary the pulse periods as desired. Pulse lengthener 304 permits this variation over a relatively large range so that the duration of the pulses applied to solenoid 282 can be increased or decreased as required. Solenoid 282, as explained previously, controls operation of clutch 250.

The circuit operates as follows: Each time that an article falls down out of tube 150 it interrupts the beam of light from lamp 166. When this occurs phototube 168 supplies an input signal to counter 12. Counter 12 is preset to produce an output signal in response to a predetermined number of successive input signals, and when this occurs, the output signal is applied to relay 300 and pulse lengthener 304 simultaneously. Relay 300 functions as a switch to alternately connect solenoids 180 and 182 to rectifier 302. When the output of counter 12 is applied to relay 300, the latter automatically performs its switching function. Assuming one of the solenoids 180 and 182 to be energized from rectifier 302 acting through relay 300, it remains energized until relay 300 is actuated by a signal from counter 12. As explained previously, when one of the solenoids 180 and 182 is energized it operates to change the position of blades 194 and 196 and to keep said blades in that position until it is de-energized, whereupon the blades will be restored to their original position by the other newly energized solenoids.

Upon rotation of blades 194 and 196, the articles retained in housing 152 are released through discharge opening 212 and fall into the packaging machine 230 between the webs of packaging material therein in the region where the packaging material comes together between the sealing rolls.

While this is occurring pulse lengthener 304 generates, in response to the output of counter 12, an output pulse that is applied to and energizes solenoid 282. When this occurs lever arm 276 is withdrawn from clutch element 254, allowing the latter to be driven by clutch element 252 to drive the sealing rolls of the packaging machine. Solenoid 282 remains energized for the time duration of the pulse applied to it by pulse lengthener 304. As soon as the pulse has terminated, solenoid 282 becomes de-energized and lever 276 is drawn by spring 290 back into engagement with the cam surface 270 of clutch element 254. This occurs before the clutch completes one complete revolution so that when clutch element 254 returns to its original position abutment 280 will be engaged by lever 276 to stop rotation of clutch element 254. As provided in the aforesaid Lewis patent, it is to be understood that the sealing rolls will advance or index one package for each revolution of the drive sprocket. Thus the single revolution clutch effectively causes the drive sprocket to make a single revolution, stop, make another revolution, stop, and so on, so as to cause the sealing rolls to advance one package at a time. Each time that a charge is released to the packaging machine clutch 250 will be actuated by counter 12 to cause operation of the sealing rolls.

The reason for including pulse lengthener 304 in the circuit is important. In general it was found that the output of commercially available counters was variable as to time duration to only a limited degree. Thus, for example, a particular type of counter would be adapted to give output signals having a time duration of 1/10, 1/4 and 1 second, as desired, but was incapable of having a pulse duration of any other desired amount between the upper and lower limits. Accordingly the counter and packaging machine had to be geared to provide synchronization using one of the available outputs of the counter. Although this was possible it limited output of the system because of the need for so timing the operation of the clutch solenoid as to prevent two charges from being deposited in the same package formed by the packaging machine.

Figure 13:
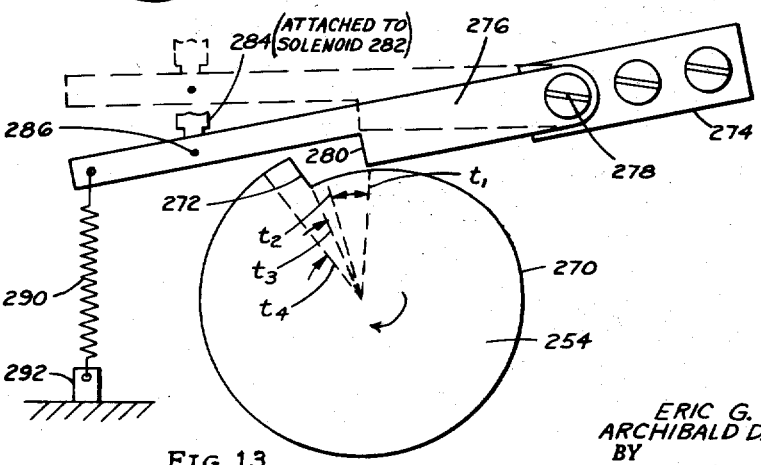
FIG. 13 is an enlarged schematic view of certain parts of the clutch assembly illustrating the need for variable control of the counter's output signals.

FIG. 13 illustrates how such an error could arise and how the pulse lengthener acts to prevent such an error. In this figure assume, for example, that clutch member 270 is rotating at such a rate that the angle subtended by dotted lines t, and $t_4$ represents a time interval of 1/2 second, the angle subtended by lines t, and $t_2$ represents a time interval of 1/4 second, and the angle subtended by lines t, and $t_3$ represents a time interval of 1/3 second. Assume also that the abutment 272 and the lever 276 are instantaneously in the position illustrated, with the solenoid having previously been energized and de-energized in response to a signal from the counter, having a time duration of 1/4 second. If now a new signal is applied to solenoid 282, lever 276 would move to the position shown in phantom and then return to its original position, all in a time period of about 1/4 second. However, since the clutch abutment was spaced away from its normal point of contact with lever 276 by 1/3 of a second, upon termination of said new signal, the lever would still be engaged by the abutment and disengage the clutch. Since the time the new signal was applied to solenoid 282 a new charge was being introduced to the packaging machine, the new charge would be added to the previous charge which would not have moved out of position due to the clutch being again disengaged. However, if now the time duration of the output pulse of the counter had been increased to ½ second by adjustment of the pulse lengthener, lever 276 would be held away from cam surface 270 until abutment 272 has passed beyond its normal point of contact with lever 276. Thus lever 276 would re-engage cam surface 270 behind abutment 272 and would ride on the cam surface without causing disengagement of the clutch until abutment 272 came around again. Consequently, the packaging machine will continue to operate so as to separately package successive charges. It is to be noted that the speed at which a charge is wrapped when the wrapping machine is operating varies with the package size.

It is believed apparent, therefore, that the pulse lengthener is an important element of the circuit. However, it may be omitted provided a counter is used whose output is capable of being varied as desired relative to pulse period.

The need for the clutch and means for varying the length of the output pulse of the counter arises due to the fact that the charges are not deposited in the wrapping machine at a constant rate. If the rate at which charges are deposited in the wrapping machine were constant, then the machine could be set to run at a constant speed and the clutch could be eliminated. In the absence of a constant rate of feed the machine must be capable of operation intermittently. Hence the use of a clutch. However, under optimum conditions achieved by the present invention, the wrapping machine approximates a continuously operating device. Thus, for example, when the counter is processing articles at an average rate of 1100 per minute, and segregating them into charges or groups of 100, the rate at which charges are released to the wrapping machine is substantially or almost constant so that the speed of the wrapper can be set at a level such that the wrapper will operate substantially continuously. The clutch provides assurance that the wrapper will keep in step with variation in the charge rate and the pulse lengthener provides assurance against overlap so that successive charges will be separately packaged.

It is contemplated that a magnetic detector may be employed in place of the electric eye system. It is also appreciated that the output signal from the electronic counter may be used to control other equipment, e.g., when filling boxes, to energize box closing equipment.

One distinct advantage of the counting machine resides in the two adjustable guide members provided to channel the articles in single file. Because the guides are adjustable the machine is capable of successfully handling many different types of articles with little loss of time for making the machine ready for operation.

Obviously many modifications and variations of the present invention are possible in the light of the above teachings. Therefore, it is to be understood that the invention is not limited in its application to the details of construction and arrangement of parts specifically described or illustrated, and that within the scope of the appended claims it may be practiced otherwise than as specifically described or illustrated.

We claim:

1. Apparatus for counting articles and packaging said articles in predetermined quantities comprising, means for storing a plurality of like articles, means for removing said articles from said storage means, means for separating said removed articles and advancing them in single file to secondary storage means provided with a [removable] *movable* gate normally acting to prevent said articles from escaping therefrom, a photoelectric tube, a light source providing a beam of light directed at said photoelectric tube across the path traveled by said removed articles as they advance in single file to said secondary storage means, electronic counting means coupled to said photoelectric tube and adapted to provide an output signal when said light beam has been interrupted a predetermined number of times by successive ones of said removed articles advancing in single file to said secondary storage means, means responsive to said output signal for moving said gate to release articles accumulated within said secondary storage means and for reclosing said gate thereafter to allow additional articles to accumulate, a packaging machine positioned to receive articles discharged from said secondary storage means, said packaging machine comprising means for forming a sealed package about said articles, drive means for said package forming means, electrically operated means responsive to said output signal for actuating said drive means in timed relation with movement of said gate, and means for terminating operation of said drive means after said articles have been packaged.

2. Apparatus for counting articles and packaging said articles in predetermined quantities as defined in claim 1, further including means connected in the output circuit of said counting means for varying the time duration of each signal passing from said counting means to said electrically operated means.

3. Apparatus for counting articles and segregating said articles in groups of identical predetermined number, said apparatus comprising a storage hopper for said articles having an opening through which articles are discharged therefrom, an endless belt conveyor positioned to receive articles discharged from said hopper, said conveyor having an upper article-conveying run traveling in a horizontal plane from an article-receiving position adjacent to said hopper to a predetermined article-discharging position and a lower run traveling from said article-discharging position back to said article-receiving position, a pair of spaced parallel guides located above said upper run, said guides having vertical flanges on their adjacent edges defining a channel between which articles on said upper run advance in single file to said article-discharging position, a vertically-extending housing open at its top and bottom ends, means supporting said housing with its open top end in position to receive articles falling free under the influence of gravity after discharge from said conveyor, a shutter mounted in said housing adjacent its bottom end, said shutter comprising a horizontal shaft extending transversely of said housing and diametrically-opposed radially extending planar members affixed to said shaft, a pair of bearings secured to said housing rotatably supporting the opposite ends of said shaft, a first rotary-acting solenoid connected to one end of said shaft for rotating said shaft in a first direction to shift said planar members from a first inclined position to a second inclined position, a second rotary-acting solenoid identical to said first solenoid attached to the opposite end of said shaft for rotating said shaft in a second opposite direction to shift said planar members back to said first inclined position, said planar members having a length running radially from the axis of said shaft of sufficient magnitude to divert falling articles to one side of said housing when in said first inclined position and to the other side of said housing when in said second inclined position, a photoelectric tube, a light source providing a beam of light directed at said photo-electric tube across the free-fall path traveled by said articles between said conveyor and said shutter, electronic counting means coupled to said photoelectric tube for providing an output signal when said light beam has been interrupted a predetermined number of times by said free-falling articles, and means for energizing said first and second solenoids alternately in response to successive output signals.

4. Apparatus as defined by claim 3, further including first and second inclined inwardly extending plates attached to opposite walls of said housing at its bottom end, said first and second plates having their inner edges spaced to define a restricted article-discharge opening, said first plate having its inner edge positioned to be engaged by one of said planar members of said shutter when said planar members are in said first inclined position and said second plate having its inner edge positioned to be engaged by said one planar member when said planar members are in said second inclined position.

5. Apparatus for counting articles and delivering them to a desired location in groups of identical predetermined number comprising, means for storing a supply of said articles, a feed roll for removing said articles from said storage means, said feed roll tapering inwardly from its ends to an intermediate constant diameter section provided with stepped surfaces for picking up articles in said storage means, means for separating said removed articles, means for advancing said separated articles in single file along a horizontal path to a point of discharge where said articles fall freely under the influence of gravity, gate means normally positioned in the path of said free-falling articles, whereby to cause said articles to accumulate in a group upstream of said gate, means for detecting each article as it falls freely under the influence of gravity, and means for opening said gate when a predetermined number of articles have been detected whereby to release the articles that have accumulated upstream of said gate, and for reclosing said gate to allow additional articles to accumulate.

6. Apparatus for counting articles and segregating them in groups, comprising means for separating a plurality of articles and advancing them in single file along a horizontal path to a point of discharge where they fall freely under the influence of gravity, an article-diverting shutter including a horizontally extending shaft positioned in the path of said free-falling articles, bearing rotatably supporting said shaft, first and second rotary acting solenoids connected to opposite ends of said shaft, said first solenoid when energized acting to rotate said shaft to turn said shutter from a first article-diverting position to a second article-diverting position, said second solenoid when energized acting to rotate said shaft to return said shutter to said first position, means for detecting each article as it falls freely under the influence of gravity, and means for energizing said first solenoid when a predetermined number of articles have been detected with said shutter in said first position and for energizing said second solenoid when a predetermined number of articles have been detected with said shutter in said second position.

7. Apparatus for counting articles and delivering them to a desired location in groups of identical predetermined number comprising, means for storing a supply of articles to be counted, means for transporting articles from said storage means along a horizontal path to a point of discharge where said articles fall freely under the influence of gravity, said article transporting means comprising an endless belt conveyor having a horizontal upper run, means for discharging articles from said storage means onto said upper run of said belt conveyor, first and second guide means for channeling articles into single file on said upper run, said first and second guide means comprising first portions running from said point of discharge toward said storage means and second portions continuous with said first portions at the end nearest said storage means, said first portions residing in a horizontal plane above said upper run and having parallel spaced vertically depending flanges extending longitudinally of said conveyor, said flanges defining a channel therebetween in which articles carried by said upper run can move only in single file as they advance toward said point of discharge, said flanges having bottom edges terminating just short of contact with said upper run, said second portions being set at a compound angle to said first portions, sloping downwardly toward the center line of said upper run and sloping also toward said storage means, said second portions having edges continuous with said bottom edge of said depending flanges, whereby articles discharged from said storage means onto said upper run are deflected by said second portions toward the center of said upper run for single-file movement between said depending flanges toward said point of discharge, a shutter positioned in the path of said free-falling article-diverting position, second means for turning said shutter to a second article-diverting position, means for detecting each article as it falls freely under the influence of gravity, means for producing an output signal each time a predetermined number of articles have been detected, and means for actuating said first and second shutter turning means alternately in response to successive output signals.

8. Apparatus for counting articles and segregating them into groups each totalling a predetermined number, said apparatus comprising means for storing a supply of articles to be counted, means for removing articles from said storage means and for advancing them in single file along a substantially horizontal path to a point of discharge where they fall freely under the influence of gravity, gate means normally positioned in the path of said free-falling articles, said gate comprising a horizontal shaft, bearings rotatably supporting said shaft, a pair of oppositely disposed blades secured to said shaft, a first solenoid connected to one end of said shaft for rotating said shaft to turn said blades back to said first inclined position, means for detecting each article as it falls freely from said point of discharge to said gate, means for generating an electric signal when a predetermined number of articles have been detected, and means for energizing said solenoids sequentially in response to successive output signals.

9. Apparatus as defined by claim 8 further including stationary means cooperating with said gate to cause free-falling articles to accumulate upstream of said gate only when said blades are in said first inclined position.

10. Apparatus as defined by claim 9 further including second stationary means cooperating with said gate to cause free-falling articles to accumulate upstream of said gate only when said blades are in said second inclined position.

11. In apparatus for counting and batching free-falling articles, the improvement comprising a stationary housing having a plurality of wall members defining an open top through which said articles may enter and an open bottom through which said articles may leave, at least two of said walls being in opposed parallel spaced relation to each other, a horizontal shaft extending through said two walls, bearing means rotatably supporting said shaft, a pair of opposed radially extending blades secured to said shaft within said housing, a first rotary-acting solenoid operatively connected to one end of said shaft for rotating said shaft to turn said blades to a first inclined position wherein articles are diverted laterally in a first direction, and a second rotary-acting solenoid operatively connected to the opposite end of said shaft for rotating said shaft to turn said blades to a second inclined position wherein articles are diverted laterally in a second direction.

References Cited in the file of this patent or the original patent

UNITED STATES PATENTS

| | | |
|---|---|---|
| 1,001,179 | Sullivan | Aug. 22, 1911 |
| 1,354,250 | Hawthrone | Sept. 28, 1920 |
| 2,141,318 | Salfisberg | Dec. 27, 1938 |
| 2,523,517 | Potter | Sept. 26, 1950 |
| 2,626,494 | Lewis | Jan. 27, 1953 |
| 2,709,880 | Jorgensen | June 7, 1955 |
| 2,763,108 | Garrett | Sept. 8, 1956 |